(12) United States Patent
Parsons et al.

(10) Patent No.: US 11,559,905 B2
(45) Date of Patent: Jan. 24, 2023

(54) SUBSEA MANIPULATOR

(71) Applicant: Houston Mechatronics, Inc., Webster, TX (US)

(72) Inventors: Adam Parsons, Webster, TX (US); Nicolaus Radford, Webster, TX (US); Sean Halpin, Webster, TX (US); Kris Verdeyen, Webster, TX (US)

(73) Assignee: Nauticus Robotics Holdings, Inc., Webster, TX (US)

( * ) Notice: Subject to any disclaimer, the term of this patent is extended or adjusted under 35 U.S.C. 154(b) by 445 days.

(21) Appl. No.: 16/782,132

(22) Filed: Feb. 5, 2020

(65) Prior Publication Data
US 2021/0237280 A1 Aug. 5, 2021

(51) Int. Cl.
*G06F 17/00* (2019.01)
*B25J 15/04* (2006.01)
(Continued)

(52) U.S. Cl.
CPC ............. *B25J 15/04* (2013.01); *B25J 9/0087* (2013.01); *B25J 9/06* (2013.01); *B25J 9/123* (2013.01); *B25J 9/1633* (2013.01); *B25J 9/1694* (2013.01); *B25J 15/0019* (2013.01); *B25J 15/0028* (2013.01); *B25J 15/0408* (2013.01); *B25J 15/0491* (2013.01); *B25J 19/0025* (2013.01);
(Continued)

(58) Field of Classification Search
CPC ... B25J 15/04; B25J 9/0087; B25J 9/06; B25J 9/123; B25J 9/1633; B25J 9/1694; B25J 15/0019; B25J 15/0028; B25J 15/0408; B25J 15/0491; B25J 19/0025; B25J 19/023; B25J 11/0055; B25J 13/085; B25J 15/10; B25J 9/12; B63G 8/001; B63G 2008/005; F15B 15/088
USPC ......................................................... 414/800
See application file for complete search history.

(56) References Cited

U.S. PATENT DOCUMENTS 4,227,853 A     10/1980 Woodford et al.
5,039,254 A *   8/1991 Piercy ................... B25J 9/0087
                                                    405/188
(Continued)

FOREIGN PATENT DOCUMENTS

CN      104772753 A      7/2015
CN      108789364 A      11/2018
(Continued)

OTHER PUBLICATIONS

Underwater manipulation; Manipulator control; Robot arm; Marine robotics; ROV Ocean Engineering; Sep. 2018 (Year: 2018).*
(Continued)

*Primary Examiner* — Ronnie M Mancho
(74) *Attorney, Agent, or Firm* — Osha Bergman Watanabe & Burton LLP

(57) ABSTRACT

A subsea manipulator for a remotely operated underwater vehicle (ROV) that includes at least one linear, oil-filled electric actuator to control a motion of the manipulator in a subsea environment is disclosed. The remotely operated underwater manipulator includes an electric actuator for each axis of motion of the manipulator, and an end effector that includes a rotational joint and a tool motor for controlling a tool affixed to the end effector. A method for changing the tool of the manipulator in a subsea environment is disclosed.

19 Claims, 9 Drawing Sheets

(51) Int. Cl.

| | | |
|---|---|---|
| *B25J 9/00* | (2006.01) | |
| *B25J 9/06* | (2006.01) | |
| *B25J 9/12* | (2006.01) | |
| *B25J 9/16* | (2006.01) | |
| *B25J 15/00* | (2006.01) | |
| *B25J 19/00* | (2006.01) | |
| *B25J 19/02* | (2006.01) | |
| *B63G 8/00* | (2006.01) | |
| *F15B 15/08* | (2006.01) | |

(52) U.S. Cl.
CPC ............ *B25J 19/023* (2013.01); *B63G 8/001* (2013.01); *F15B 15/088* (2013.01); *B63G 2008/005* (2013.01)

(56) References Cited

U.S. PATENT DOCUMENTS

| | | | |
|---|---|---|---|
| 8,900,106 B2 | 12/2014 | McCoy, Jr. | |
| 9,051,036 B2 * | 6/2015 | Kim | B63G 8/16 |
| 9,487,281 B2 * | 11/2016 | Wolfenbarger | B63G 8/001 |
| 9,827,677 B1 * | 11/2017 | Gilbertson | B25J 9/046 |
| 9,840,886 B1 * | 12/2017 | Gable | E21B 33/076 |
| 9,981,382 B1 * | 5/2018 | Strauss | B25J 9/1666 |
| 10,315,740 B2 * | 6/2019 | Ferguson | B63G 8/001 |
| 10,556,630 B1 * | 2/2020 | Bingham | B62D 37/00 |
| 10,921,475 B2 * | 2/2021 | Fyffe | B63G 8/001 |
| 2010/0042357 A1 * | 2/2010 | McCoy, Jr. | B25J 9/1694 |
| | | | 702/141 |
| 2013/0269585 A1 * | 10/2013 | Kim | B62D 57/032 |
| | | | 114/337 |
| 2017/0095937 A1 | 4/2017 | Williams | |
| 2017/0355431 A1 * | 12/2017 | Jun | B63G 8/14 |
| 2018/0021945 A1 | 1/2018 | Pettersen et al. | |
| 2018/0079476 A1 * | 3/2018 | Abdellatif | B63B 59/08 |
| 2018/0251199 A1 * | 9/2018 | Radford | B25J 11/00 |
| 2019/0314873 A1 * | 10/2019 | Carlsen | B63G 8/001 |
| 2020/0110187 A1 * | 4/2020 | Fyffe | G01V 1/3852 |
| 2020/0110189 A1 * | 4/2020 | Fyffe | B63G 8/001 |
| 2021/0147052 A1 * | 5/2021 | Lotz | B63G 8/08 |
| 2021/0187748 A1 * | 6/2021 | Satat | B25J 19/023 |
| 2021/0237280 A1 * | 8/2021 | Parsons | B25J 19/0025 |
| 2021/0300513 A1 * | 9/2021 | Allotta | B63G 8/16 |

FOREIGN PATENT DOCUMENTS

| | | |
|---|---|---|
| CN | 110253616 A | 9/2019 |
| JP | 2015093329 A | 5/2015 |
| KR | 101948489 B1 | 2/2019 |

OTHER PUBLICATIONS

An Underwater Robotic Manipulator with Soft Bladders and Compact Depth-Independent Actuation | Soft Robotics; Oct. 16, 2020 (Year: 2020).*

Underwater manipulators: A review—ScienceDirect https://www.sciencedirect.com/journal/ocean-engineering; (Year: 2018).*

Extended European Search Report issued in counterpart European Patent Application No. 21155511.5, dated Jul. 15, 2021 (14 pages).

* cited by examiner

SUBSEA MANIPULATOR

BACKGROUND

Unmanned underwater vehicles (UUVs) generally fall in two categories: remotely operated underwater vehicles (ROVs) which may be controlled by a remote human operator, and autonomous underwater vehicles (AUVs) which may operate independently without direct human input. Current vehicle designs are optimized and limited to performing one mission or the other.

Most manipulation missions are performed by ROV designs. These vehicles may be specifically aimed at subsea manipulation, and these vehicles are typically tethered to topside support vessels for power and communication. As such, ROV designs take advantage of high data rates and the power rich environment afforded by the tether. However, few ROV designs use electric manipulators for subsea applications, when compared to the ubiquity of underwater hydraulic manipulators.

The few commercially available electric manipulators are much too weak to be useful for a work class ROV. Hydraulic manipulators often have no positional or force feedback, which makes them ill-suited for closed loop control. To date, subsea manipulation and intervention tasks have deployed little control sophistication, and these tasks center mostly around positional or rate controlled hydraulic arms. As such, current manipulators do not make a productive starting point toward demonstrating more advanced manipulation framework using force and impedance control algorithms.

SUMMARY

In one aspect, embodiments disclosed herein relate to a manipulator for a remotely operated underwater vehicle that includes at least one linear, oil-filled electric actuator to control a motion of the manipulator in a subsea environment. The pressure of the oil in the manipulator is at least 1 psi higher than the hydrostatic pressure outside the actuator.

In another aspect, embodiments disclosed herein relate to a manipulator for a remotely operated underwater vehicle that includes an electric actuator for each axis of motion of the manipulator, and an end effector that includes a rotational joint and a tool motor for controlling a tool affixed to the end effector.

In another aspect, embodiments disclosed herein relate to a method of changing a tool on a manipulator in a subsea environment. The method includes engaging a split spring engagement ring clamp of an end effector with an external tool, and loosening the tool from the end effector. The tool is disposed in a tool storage location and removed from the end effector. A new tool is selected from the tool storage and the end effector is disposed into the new tool. The split engagement ring clamp of the end effector is engaged with the external tool and the new tool is tightened onto the end effector. The split engagement ring clamp of the end effector is then disengaged from the external tool.

BRIEF DESCRIPTION OF DRAWINGS

Certain embodiments of the present disclosure will be described with reference to the accompanying drawings. However, the accompanying drawings illustrate only certain aspects or implementations of the present disclosure by way of example and are not meant to limit the scope of the claims.

DETAILED DESCRIPTION

Figure 1:
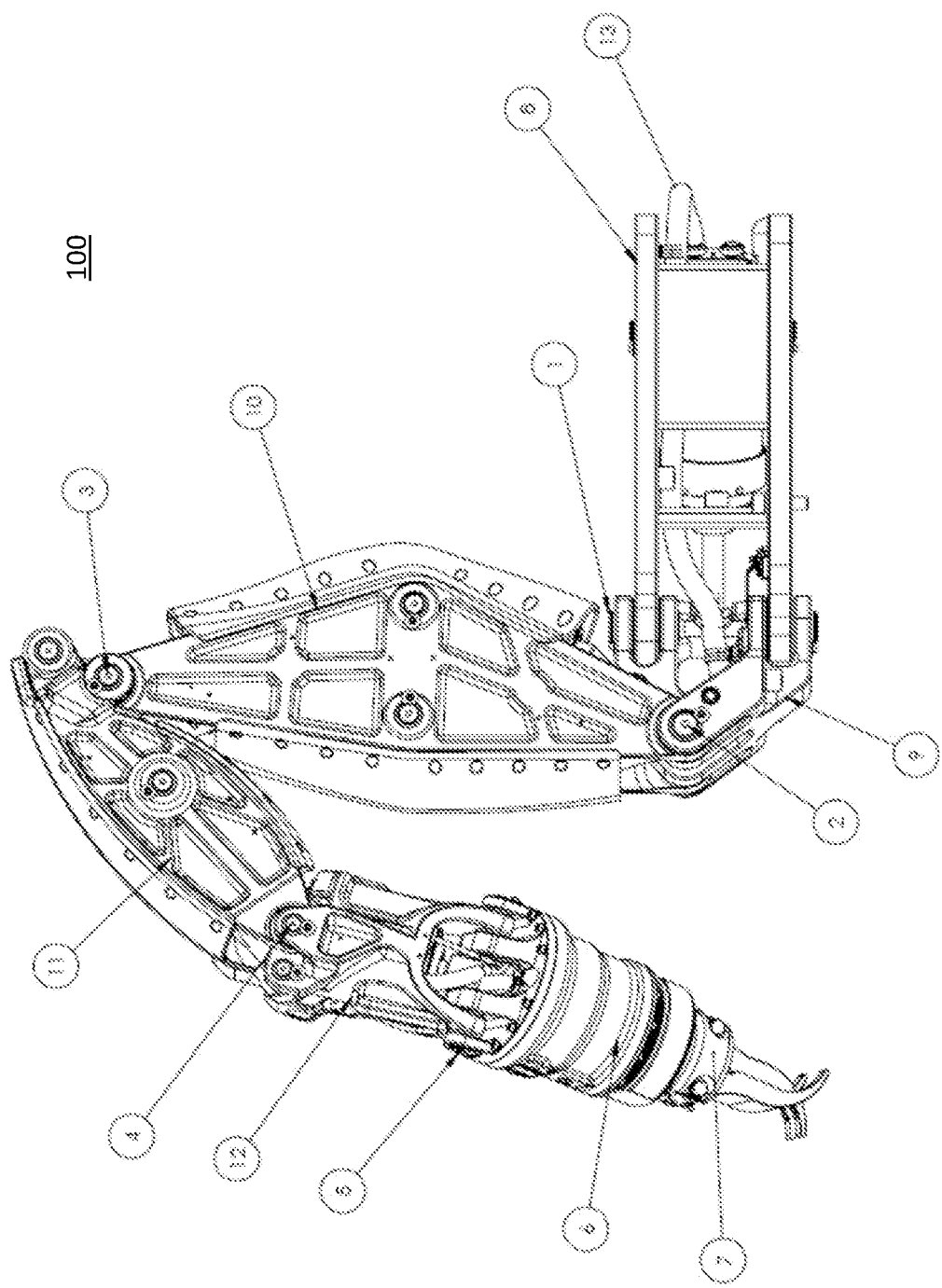
FIG. 1 shows a perspective view of a subsea manipulator in accordance with one or more embodiments of the present disclosure.

Specific embodiments will now be described with reference to the accompanying drawings. In the following description, numerous details are set forth as examples of the present disclosure. It will be understood by those skilled in the art that one or more embodiments of the present disclosure may be practiced without these specific details and that numerous variations or modifications may be possible without departing from the scope of the invention. Certain details known to those of ordinary skill in the art are omitted to avoid obscuring the description.

Embodiments disclosed herein generally relate to manipulators for ROVs. More specifically, embodiments disclosed herein related to a manipulator for a subsea ROV that uses electric actuators, in contrast to the typically-used hydraulic actuators. Embodiments of the electric manipulators are designed to mount on the front of subsea ROVs. Embodiments described herein may be considered an electric version of the current workhorses (hydraulic robotic arms) of the subsea industry.

Embodiments of the electric manipulator may include up to seven positional actuated joints or less, and at least one motor for controlling a tool. Embodiments of the electric manipulator include linear electrical actuators that extend and contract between two points on the robot. An axis of rotation is included between these two points in accordance with one or more embodiments disclosed herein. The sweeping angle of rotation between the sections on either side of the axis of rotation may be set by controlling the length of the linear actuator.

Embodiments of the electric manipulator may include bore-sighted cameras, lighting, end effector force/torque load cells, and joint level force or torque sensing.

Embodiments disclosed herein allow for coordinated joint control of the manipulator. By electrically controlling the actuators in concert, the movement of the manipulator may be precisely and easily controlled when compared to hydraulic control of each individual actuator. Coordinated joint control may include Cartesian control, as well as force and impedance control, of the manipulator. Such coordinated joint control allows for automated actions of the manipulator. For example, stowing or unstowing the manipulator for transportation or storage, tool changing, or other repetitive functions.

Embodiments disclosed herein may also include an external spatial sensing system, for example, cameras, 3D perception sensors, or the like. In such embodiments, the coordinate joint control may be integrated with the sensing system so that the manipulator may not completely rely on humans to drive the manipulator.

Embodiments disclosed herein have the ability to detach and attach different tools, with or without human intervention. For example, the manipulator can mount and unmount different tools, without human intervention, by interacting the tool mount with an external tool. The affixing piece of equipment is external, and the affixing piece of equipment may or may not be attached to the manipulator. In the examples demonstrated below, a rotational joint in the end effector may use an external wrench as the affixing piece to attach and detach tools. The coordinated joint control allows such functions to be performed autonomously, without human intervention.

That is, in some embodiments, the tool change may occur by a user simply selecting a desired tool, and sending a command subsea for the manipulator to autonomously change the tool. In other embodiments, a user may operate the arms while the arms are subsea to change the tools. One of ordinary skill in art will appreciate that there may exist other commands sent subsea to facilitate the changing of tools. For example, the specific step of attaching or detaching the tool may be automated. All of these embodied processing steps allow for tool changes while the manipulators are subsea.

FIG. 1 is a schematic of an electric manipulator in accordance with one or more embodiments of the invention. Starting from the base bone assembly 8, the manipulator 100 includes an azimuth axis 1, shoulder pitch axis 2, elbow pitch axis 3, wrist pitch axis 4, and wrist yaw axis 5. The axes 1-5 each establish an axis of rotation for motion of the manipulator 100. The manipulator 100 also includes end effector 6 that includes a rotational joint and tool motor. An electrical actuator in accordance with embodiments disclosed herein controls motion of the manipulator about each of the axes 1-5. A tool 7 is disposed on the end effector 6 in accordance with embodiments disclosed herein. As shown in FIG. 1, the body of the manipulator 100 also includes bone assemblies 8-12 that make up the body of the manipulator 100.

Embodiments of the manipulator 100 are controlled by an input (not shown) via the ROV. The input includes at least electrical power and a communication line. The input may also include other connections. For example, in embodiments that include a camera and/or lights mounted onto the end effector, the input may include a serial connection for the lights and an ethernet connection for the camera.

The input may be comprised of oil-filled tube containing the aforementioned connections. In such embodiments, the pressure inside the tube and actuators is greater than the outside pressure. This is in contrast to hydraulic based manipulators, which require greater pressures to enable the movement of the manipulator. For example, the pressure inside the tube and actuators may be established to be 1-20 psi higher than the pressure outside. Such embodiments may also include a fluid compensator to control the internal pressure of the oil-filled tube.

Figure 2:
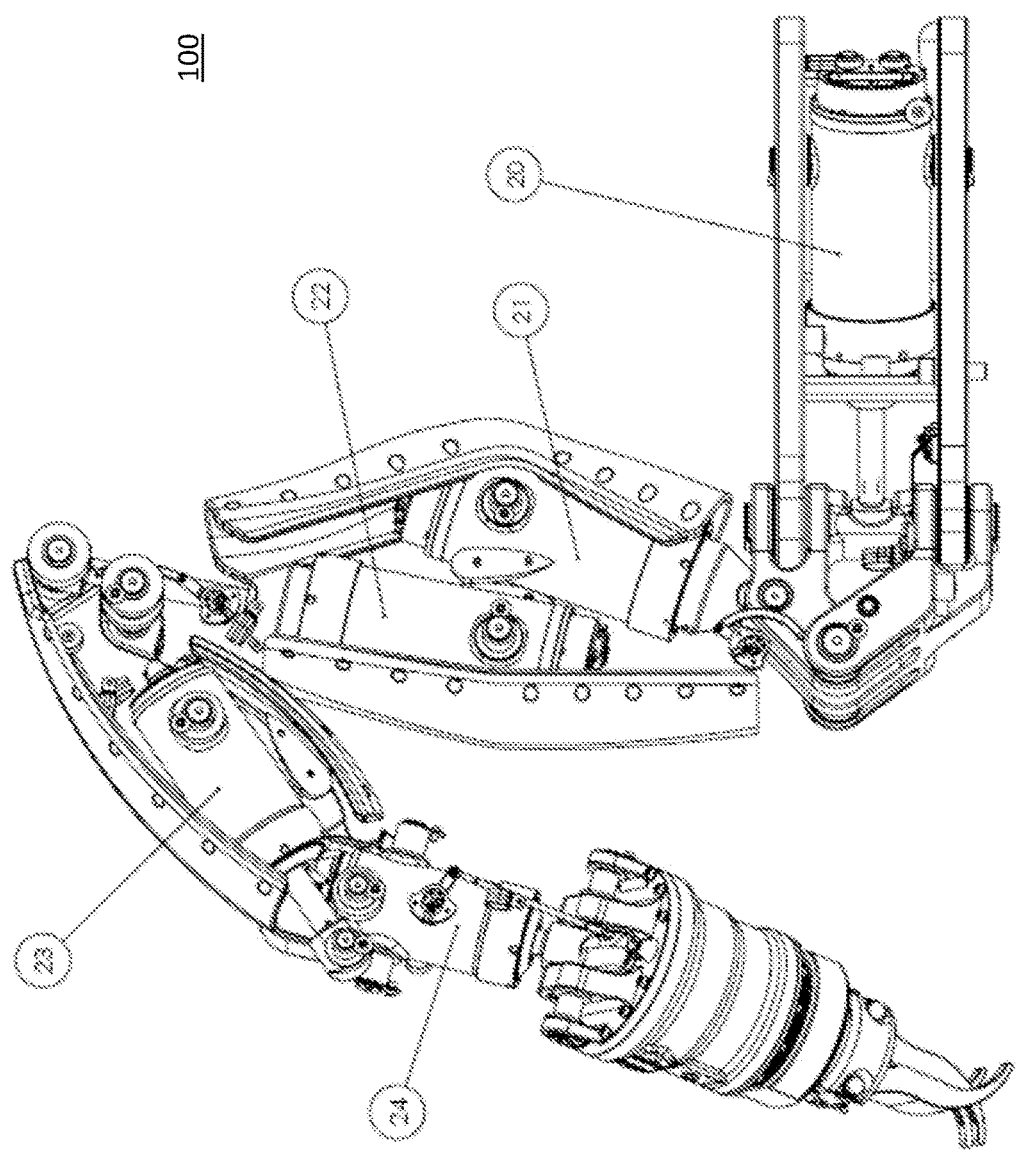
FIG. 2 shows a perspective view of a subsea manipulator's actuators in accordance with one or more embodiments of the present disclosure.

FIG. 2 demonstrates a subsea manipulator's linear actuator configuration in accordance with one or more embodiments disclosed herein. As can be seen in example of FIG. 2, the manipulator 100 may include five linear actuators 20-24. The first actuator 20 controls motion about the azimuth axis 1 shown in FIG. 1. Analogously, the second through fifth actuators 21-24 control motion about the shoulder pitch axis 2, elbow pitch axis 3, wrist pitch axis 4, and wrist yaw axis 5, respectively.

Each linear actuator actuates by an electric motor that drives a roller screw in and out, to control the motion about an axis. Advantageously, embodiments of the manipulator allow for coordinated joint control via software. That is, embodiments allow the actuators to be controlled in concert to achieve specific movements and/or tasks of the manipulator.

Figure 3:
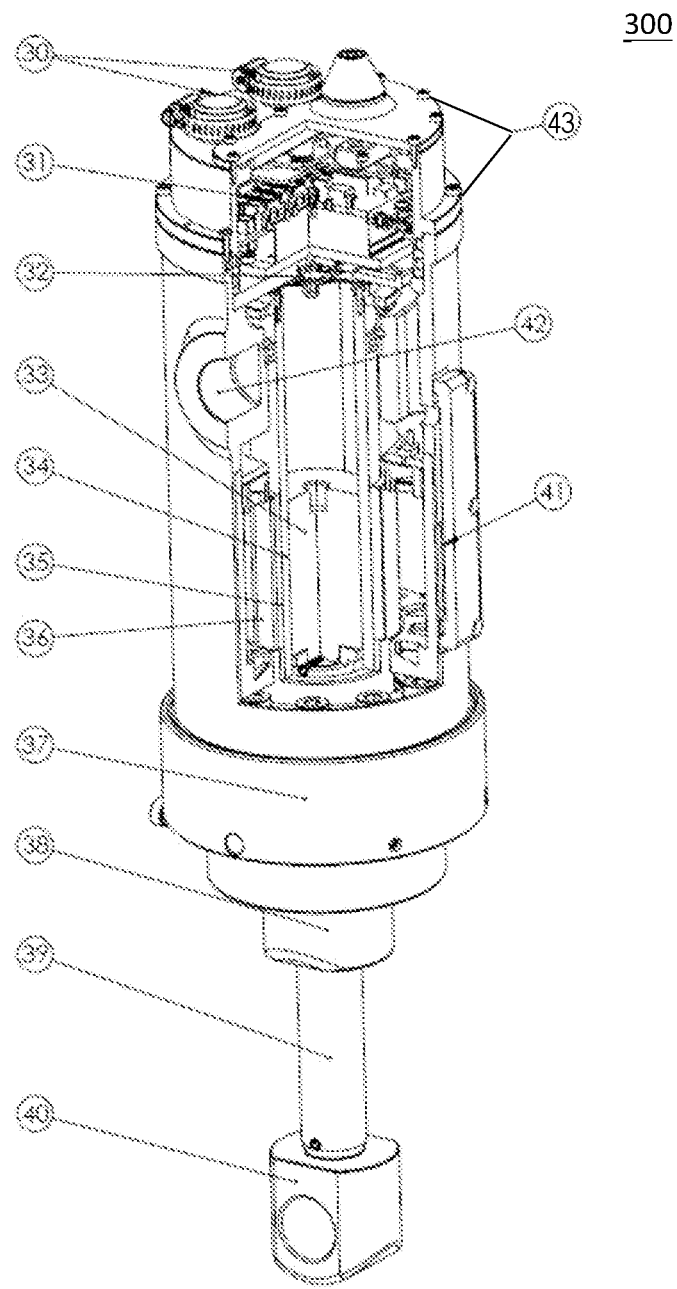
FIG. 3 shows a perspective view of an actuator in accordance with one or more embodiments of the present disclosure.

FIG. 3 shows a perspective view of one electric actuator in accordance with one or more embodiments of the present disclosure.

As demonstrated in FIG. 3, electricity is supplied through ports 30 to the custom motor drive electronics 31. A motor position sensor 32 determines the current position of the actuator 300. The motor rotor 35, motor stator 36, and thrust bearings 37 rotationally drive the roller screw nut 34 of the roller screw 33 to actuate the cylindrical output shaft 39. The output shaft 39 is fixed to the manipulator using the output pin interface 40. Embodiments of the actuator 300 include a dynamic rod seal assembly 38 so that the output shaft 39 may actuate while the interior of the actuator 300 remains sealed. The actuator ground pin holes 42 are used to attach the body of the actuator to the manipulator assembly in accordance with embodiments disclosed herein.

In accordance with embodiments disclosed herein, the screw of the roller screw 33 is connected to the output shaft 39 of the actuator 300. As the electric motor turns the roller screw nut 34, the output shaft 39 moves in and out via the rotation-to-linear-travel conversion performed by the roller screw 33. Embodiments of the actuator may be oil-filled to facilitate actuation. Embodiments of the actuator may also include a strain gauge assembly 41 for monitoring the strain on the actuator 300. The measurement of strain in the housing allows for direct force sensing at each actuator. This adds the capability of force control or force overload protection for the manipulator. In one or more embodiments, a foil strain gauge may be used in the strain gauge assembly 41.

In accordance with embodiments disclosed herein, the actuator 300 includes an actuator cap 43. The actuator cap includes the ports 30 and the motor drive electronics 31. The actuator cap 43 may facilitate the assembly and maintenance of the actuator 300. For example, when assembling the manipulator, the bodies of the actuator (the actuator 300 without the actuator cap) may be installed into the manipulator 100 first, then the appropriate length of wiring and tubing may be determined based on the actuator position. The actuator cap 43 may also facilitate repairs to manipulator, if necessary.

Figure 4:
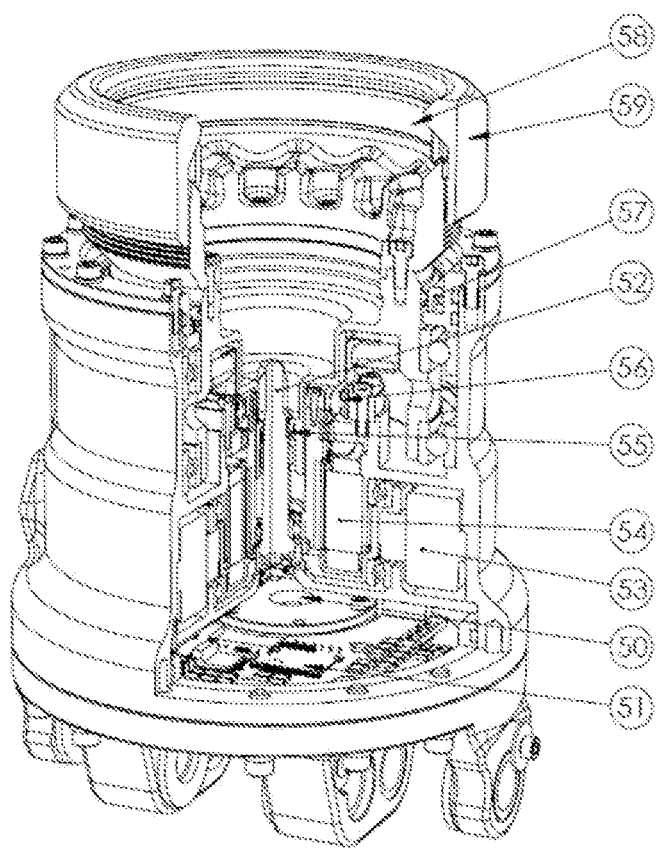
FIG. 4 shows a perspective view of a subsea manipulator's end effector in accordance with one or more embodiments of the present disclosure.

FIG. 4 shows a perspective view of a subsea manipulator's end effector in accordance with one or more embodiments of the present disclosure. In the end effector 400, the custom motor drive electronics 51 are supplied a current via the tube for cabling 50. Embodiments of the end effector 400 include a tool motor 53 and a rotational joint motor 54.

One function of the end effector 400 is a rotational joint in accordance with embodiments disclosed herein. The rotational joint motor 54 is connected to a strain wave gear box 56 to control the rotational joint at the rotary seal for the rotational joint 57. The rotational joint is a high torque/high gear ratio/low backlash solution similar to that which has been demonstrated in some robotic applications. In some embodiments, the rotational joint may be an infinite rotational joint.

In accordance with embodiments disclosed herein, another function of the end effector is tool control. Embodiments may include a rotary tool drive output shaft 52 that is controlled by the tool motor 53 in the end effector 400. In some embodiments, the tool drive output shaft 52 may have a square shaped cross-section. The tool drive output shaft 52 extends through the tool output shaft seal 55 and interacts with a tool shaft input, such as the tool shaft input 60 shown in FIG. 5.

Tool actuation using the end effector 400 may function by converting rotary motion and torque from the tool motor 53 into linear travel and force via a roller screw similar to the actuators of FIG. 3.

Figure 5:
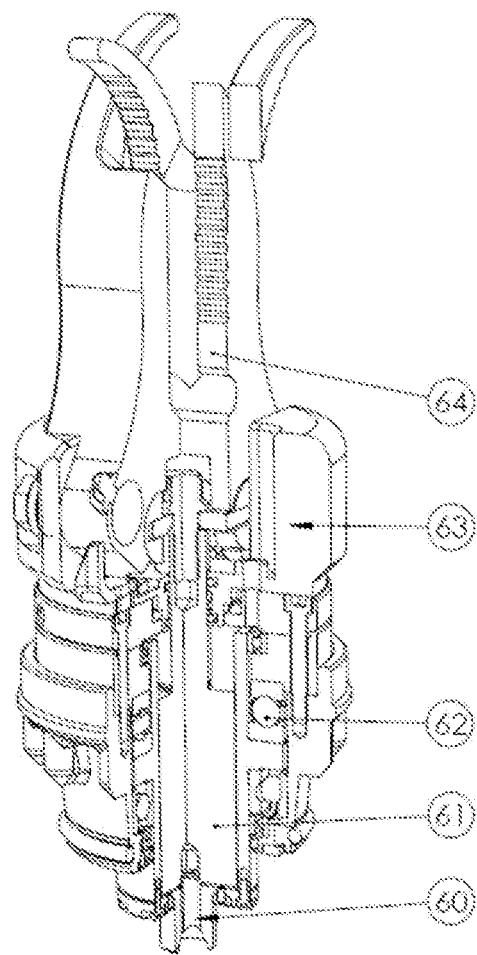
FIG. 5 shows a perspective view of a subsea manipulator's 4-finger jaw tool in accordance with one or more embodiments of the present disclosure.

In the example of FIG. 5, a gripper tool 500 that includes gripper base 63 and gripper jaws 64 is demonstrated. In such embodiments, the rotational input caused by the tool motor 53 of the end effector drives a roller screw 61 in the thrust bearings 62, which opens and closes the gripper jaws 64.

Figure 6:
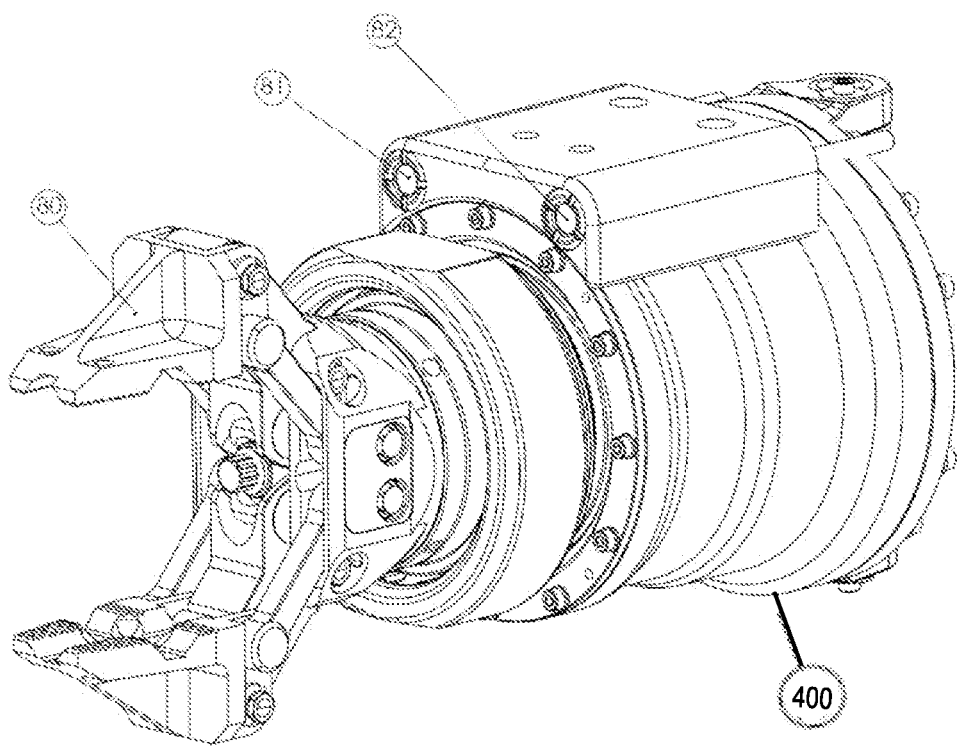
FIG. 6 show a perspective view of an end effector and parallel jaw tool in accordance with one or more embodiments of the present disclosure.

FIG. 6 is a perspective view of an end effector and tool in accordance with one or more embodiments of the present disclosure. In the embodiments described by FIG. 6, the end effector 400 includes a camera 81 and a light 82. The camera 81 and light 82 are part of the external sensing components used to control the manipulator in a subsea environment. FIG. 6 also demonstrates a parallel jaw tool 80 in accordance with embodiments disclosed herein. The parallel jaw tool 80 is also operated by the rotational input caused by the tool motor 53 of the end effector, which opens and closes the jaws of the parallel jaw tool 80.

Embodiments disclosed herein are not limited to a four finger gripper tool as shown in FIG. 5 or the parallel jaw tool shown in FIG. 6, but may also use class 1-4 torque tool, a hub cleaner, a parrot cutter, a hard line cutter, or a soft line cutter. One of ordinary skill in the art will appreciated that any tool that may be driven by the rotary drive described above may be implemented onto the manipulator.

Figure 7:
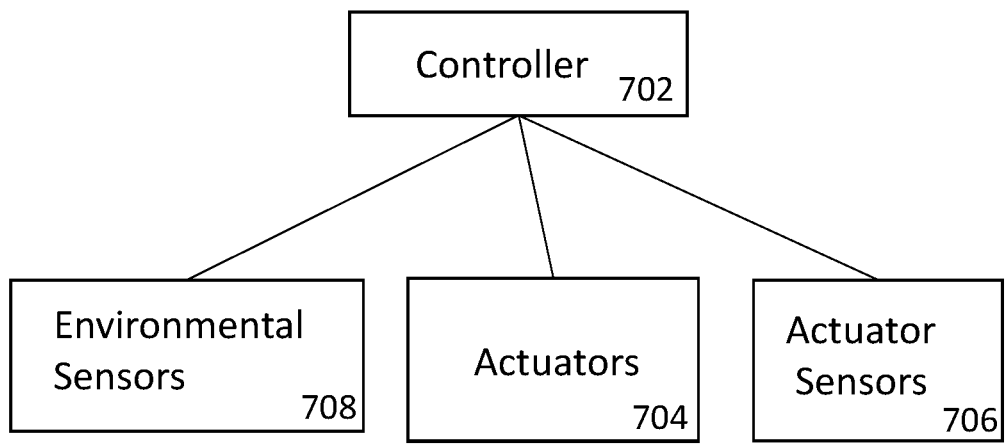
FIG. 7 shows a schematic of a system in accordance with one or more embodiments of the present disclosure.

FIG. 7 is a schematic of a system in accordance with one or more embodiments disclosed herein. The system 700 includes a controller 702, environmental sensor 708, actuators 704, and actuator sensors 706. The environmental sensors 708 include, but are not limited to, the external spatial sensing system, for example, cameras, 3D perception sensors, or the like. The actuators 704 include all of the actuators described herein. The actuator sensors 706 include motor and joint position sensors, and joint level force or torque sensing, such as the strain gauge. The actuator sensors also include the pressure monitoring sensors for oil-filled actuators that monitor the pressure in in the oil supply lines, such as a fluid compensator that controls the internal pressure of the oil-filled tubes that supply oil to the oil-filled actuators.

The controller 702 controls the actuators 704 in conjunction with the actuator sensors 706 and the environmental sensor 708. The controller 702 may use coordinated joint control, which coordinates the actuation of the different actuators for smooth desired control. As noted above, the coordinated joint control may include Cartesian-based control. The controller 702, in conjunction with the actuator sensors 706, allows for the force and impedance control of the manipulator.

The controller 702 may be operated manually by a user or as part of an established program. The controller 702 may include a computer with a user interface. The controller 702 is primarily located above the water level; however, certain components of the controller 702 may be located subsea, when the manipulators are in use. The environmental sensors and actuator sensors are primarily located subsea when the manipulator is in use, however, embodiments are not limited as such. For example, for oil-filled actuators, the oil pressure monitoring systems of the actuator sensors 706 may be located above the water level.

Embodiments disclosed herein have the ability to detach and attach different tools without human intervention at the ROV. Referring to FIG. 4, the split spring retaining ring 58 includes a split spring engagement ring clamp 59 that may be engaged with an external stationary wrench (not shown) and rotated. Such rotation causes the tool to be detached from the arm. As such, different tools may be detached or attached. Embodiments disclosed herein may provide for a user to control the individual steps necessary to change the tool. Further, one or more of such individual steps for changing the tool may be programmed so that a single command may be used. In some embodiments, a single tool-selection command may be used to automatically change the tool.

Figure 8:
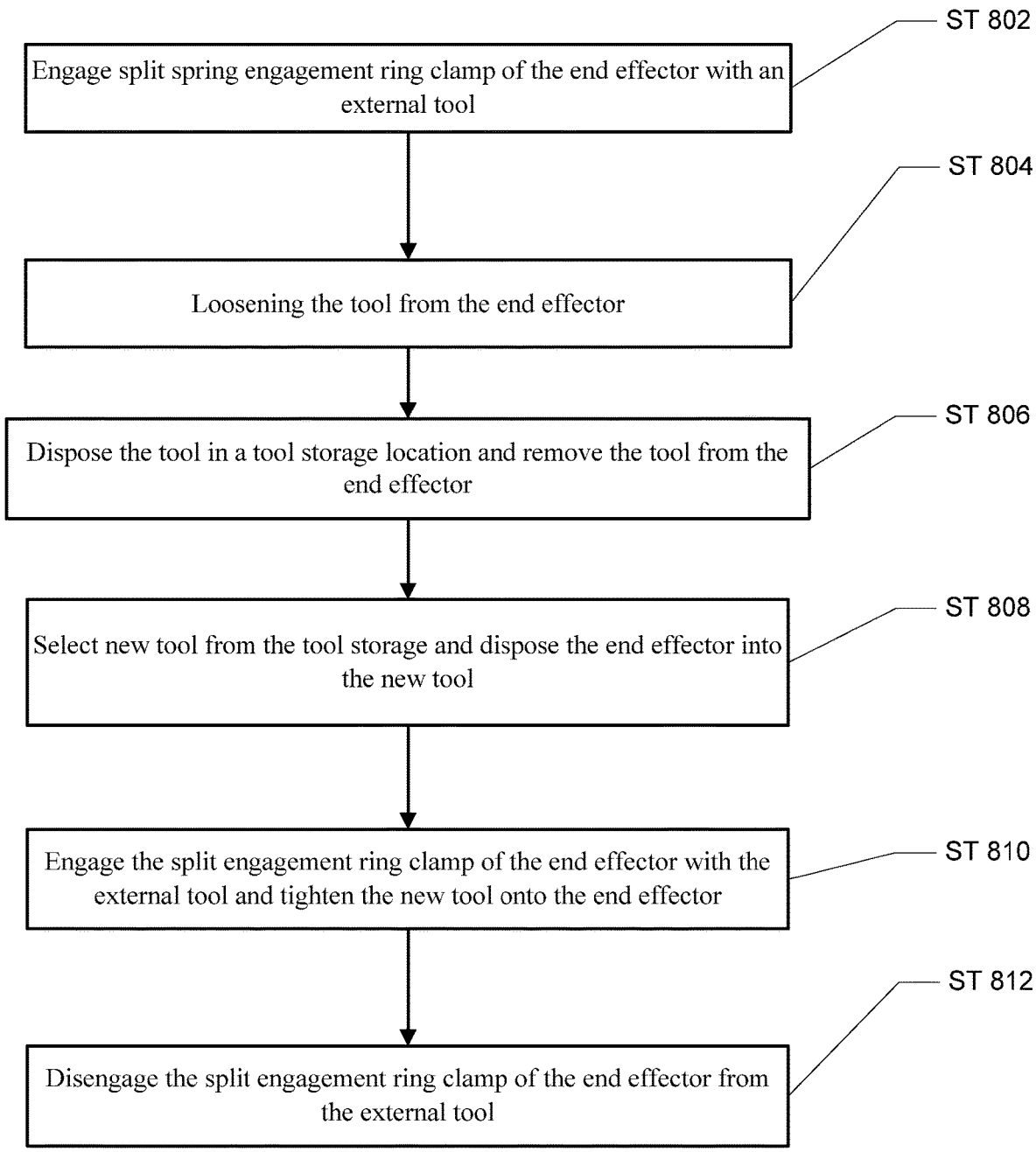
FIG. 8 shows a tool change flow chart in accordance with one or more embodiments of the present disclosure.

FIG. 8 is a flow chart in accordance with one or more embodiments of the invention. Each of the individual steps described in FIG. 8 may be performed manually by a user via the controller 700, performed by a single command from the controller 700, or be performed as part of pre-existing program of the controller 700. In ST 802, the split spring engagement ring clamp 59 of the end effector 400 is engaged with an external tool. The external tool restricts the movement of the split spring engagement ring clamp 59 and allows the end effector 400 to unscrew the tool from the end effector 400 in accordance with embodiment disclosed herein. As described above, the external tool may be a stationary wrench disposed on or near the ROV. In ST 804, the tool is loosened (unscrewed) from the end effector using the rotational joint motor 54. At the conclusion of this step, the tool may remain attached to the end effector via gaskets in the connection between the end effector and the tool.

In ST 806, the split spring engagement ring is removed from the external tool and the tool is disposed in a tool storage location. The tool storage location may be external to the ROV, or may be incorporated into the ROV. The tool storage location may be an open container that allows the movement of the manipulator to separate the tool from the end effector using a side or edge of the container. The tool storage location may also include an individual tool holder that holds the tool for separation from the end effector.

In ST 808, a new tool is selected from the tool storage, and the end effector 400 is engaged with the new tool. At this step, the new tool may be inserted into the end effector and held in place via gaskets in the connection between the end effector and the new tool. In ST 810, the split spring engagement ring clamp 59 is engaged with the external tool, and the rotational joint motor 54 is used to tighten the split spring engagement ring clamp 59 of the end effector, securing the end effector to the new tool. In ST 810, the split spring engagement ring clamp 59 is disengaged (removed) from the external tool.

In some embodiments, the external tool and the individual tool holder may be combined into a single component. In such embodiments, each available tool may be stored in an individual tool holder that may also function as the external tool to attach or detach the working tool to the end effector.

Embodiments disclosed herein have the benefit of allowing for many types of tooling without the need for removing the ROV from a subsea environment. One of ordinary skill in the art will appreciate the advantage that the tools may be changed without bringing the ROV to the surface because the ROV retrieval process may be expensive and dangerous.

Figure 9:
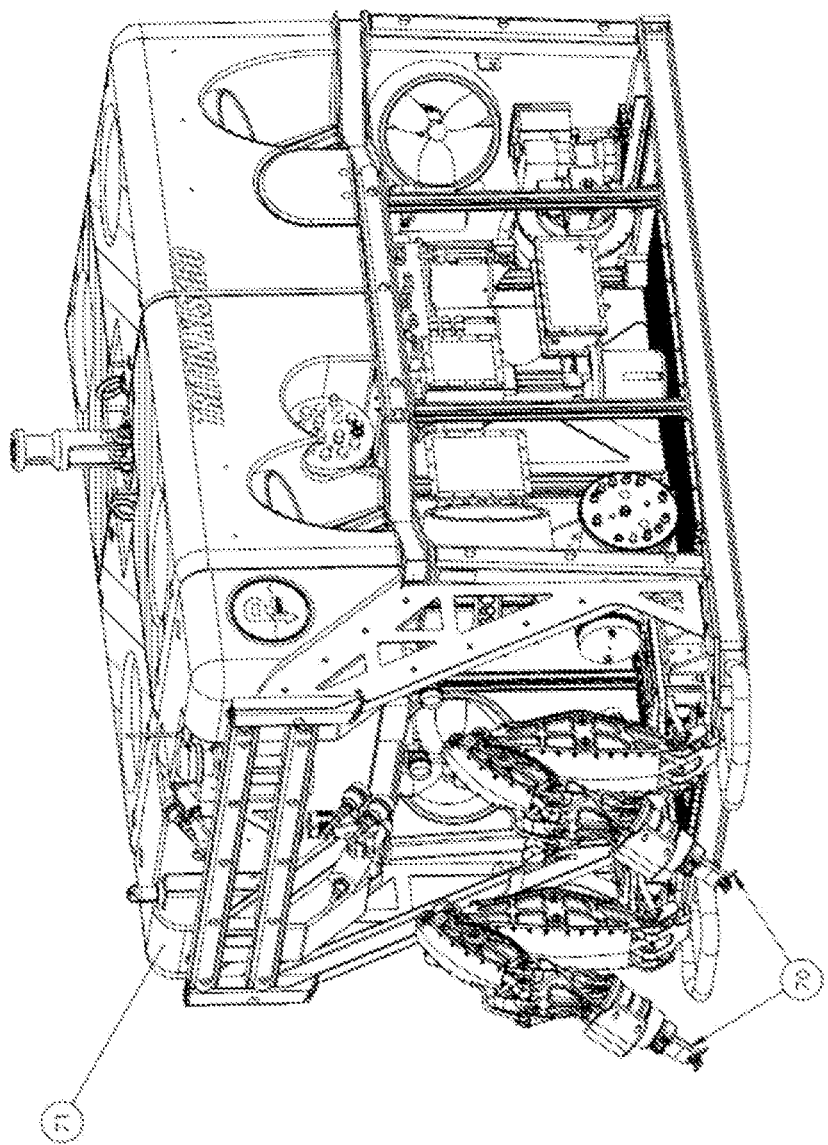
FIG. 9 shows a perspective view of two subsea manipulators mounted onto a representative ROV in accordance with one or more embodiments of the present disclosure.

FIG. 9 demonstrates an ROV with manipulators in accordance with embodiments disclosed herein. FIG. 9 shows two manipulators 70 mounted on a Triton ROV 71. Embodiments disclosed herein may not include any hydraulic mechanisms, contrary to the current workhorses in the subsea industry. An electric based manipulator may have several advantages over the current hydraulic manipulators such as no hydraulic oil leaks, finer control, and improved reliability. Embodiments disclosed herein may not include a hydraulic pumping unit, which could be considered advantageous.

Embodiments disclosed herein allow for coordinated joint control of the manipulator. By electrically controlling the actuators in concert, the movement of the manipulator may be precisely and easily controlled when compared to hydraulic control of each individual actuator.

In contrast to hydraulic actuators, embodiments of the electric actuators may have an inherently faster and linear response, natural compliance, joint level torque sensing, back-drivability, and overall higher efficiency for a force controlled subsea manipulator.

Further, the linear response of the actuators of embodiments disclosed herein may allow for a combination of joint level torque sensing methods and/or output force sensors to allow for controlling the force output of the manipulator. This allows for safer interactions with any equipment or objects that the arm contacts. In addition, the linear response of actuators of embodiments disclosed herein may provide for greater accuracy force estimations than rotary joints or pressure sensors in hydraulics.

While the present disclosure has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A manipulator for a remotely operated underwater vehicle (ROV) comprising:
   at least one linear oil-filled electric actuator to control a motion of the manipulator in a subsea environment, wherein a pressure of the oil is maintained to be at least 1 psi higher than outside the actuator.

2. A manipulator for a remotely operated underwater vehicle (ROV) comprising:
   an electric actuator for each axis of motion of the manipulator, wherein the electric actuator is an oil-filled linear actuator;
   an end effector comprising a rotational joint and a tool motor for controlling a tool affixed to the end effector; and
   a fluid compensator that maintains a pressure of the oil to be at least 1 psi higher than outside the actuator.

3. The manipulator of claim 2, wherein the oil-filled linear actuator actuates using an electric motor that rotationally drives a nut of a roller screw.

4. The manipulator of claim 3, wherein each of the electric actuator and the tool motor includes a position sensor for determining the current position of the electric actuator.

5. The manipulator of claim 2, wherein the tool motor is a rotary electric actuator that actuates using an electric motor that rotationally drives an input of the tool.

6. The manipulator of claim 5, wherein the tool comprises a rotational input that causes jaws to open or close.

7. The manipulator of claim 2, wherein the end effector changes tools by interacting the rotational joint of the end effector with an external tool.

8. The manipulator of claim 2, wherein the tool is selected from one of the following: a two finger gripper, a four finger gripper, parallel jaws, class 1-4 torque tool, hub cleaner, parrot cutter, hard line cutter, and soft line cutter.

9. The manipulator of claim 2, wherein the manipulator comprises at least six electric actuators.

10. The manipulator of claim 2, further comprising: at least one camera mounted to the end effector.

11. The manipulator of claim 2, wherein the manipulator is controlled using coordinated joint control.

12. The manipulator of claim 11, wherein the coordinated joint control includes Cartesian control, or force and impedance control of the manipulator.

13. The manipulator of claim 11, wherein the manipulator changes tools in a subsea environment, without direct human contact to the ROV.

14. The manipulator of claim 11, further comprising: a spatial sensing system that operates in conjunction with the coordinated joint control to autonomously control the manipulator.

15. The manipulator of claim 2, wherein strain measurements are used to sense and control a force of the actuator.

16. A method of changing a tool on a manipulator in a subsea environment, the method comprising:
   engaging a split spring engagement ring clamp of an end effector with an external tool;
   loosening the tool from the end effector;
   disposing the tool in a tool storage location and removing the tool from the end effector;
   selecting a new tool from the tool storage and disposing the end effector into the new tool;
   engaging the split engagement ring clamp of the end effector with the external tool and tightening the new tool onto the end effector; and
   disengaging the split engagement ring clamp of the end effector from the external tool.

17. The method of claim 16, wherein the tool is selected from one of the following: a two finger gripper, a four finger gripper, parallel jaws, class 1-4 torque tool, hub cleaner, parrot cutter, hard line cutter, and soft line cutter.

18. The method of claim 16, wherein the end effector changes tools by interacting a rotational joint of the end effector with an external tool.

19. The method of claim 16, wherein the tool is actuated by a rotary electric actuator that rotationally drives an input of the tool.

* * * * *